United States Patent
Kawai

(10) Patent No.: US 6,846,174 B2
(45) Date of Patent: Jan. 25, 2005

(54) OPTICAL DISK STAMPER

(75) Inventor: Toshio Kawai, 6-2 Uguisugaoka, Kawanishi-shi, Hyogo 665-0007 (JP)

(73) Assignee: Toshio Kawai, Kawanishi (JP)

( * ) Notice: Subject to any disclaimer, the term of this patent is extended or adjusted under 35 U.S.C. 154(b) by 168 days.

(21) Appl. No.: 10/065,079

(22) Filed: Sep. 16, 2002

(65) Prior Publication Data

US 2003/0091682 A1 May 15, 2003

(30) Foreign Application Priority Data

Nov. 15, 2001 (JP) ........................................ 2001-350412

(51) Int. Cl.⁷ ............................................. B29D 11/00
(52) U.S. Cl. ...................................... 425/470; 425/810
(58) Field of Search ................................ 425/470, 810; 264/106, 107; 249/134

(56) References Cited

U.S. PATENT DOCUMENTS 4,723,903 A * 2/1988 Okazaki et al. ............. 425/385
6,354,827 B1 * 3/2002 Kerfeld ...................... 425/195
6,706,465 B1 * 3/2004 Sano .......................... 430/320

* cited by examiner

Primary Examiner—James P. Mackey
Assistant Examiner—Donald Heckenberg
(74) Attorney, Agent, or Firm—James Judge

(57) ABSTRACT

Optical-disk stamper that prevents mold-release defects caused by mold-release irregularities that occur when the mold is opened while improving transferability during disk molding to enable the manufacture of high-quality optical disks at a favorable yield rate. On one side of a stamper body (1), a molding surface (2) furnished when bumps (3) for imprinting pits into an optical disk is formed. The molding surface, including the bumps, is formed of a polymer resin whose thermal diffusivity is 0.01 $m^2/h$ or under. More preferably the molding surface is formed of a poorly heat-conducting phenolic resin whose thermal diffusivity is between 0.0004 and 0.001 $m^2/h$, suppressing heat diffusion from the molten resin toward the stamper during the disk molding process and nullifying rapid cooling and local hardening of the resin.

8 Claims, 4 Drawing Sheets

OPTICAL DISK STAMPER

BACKGROUND OF THE INVENTION

1. Technical Field

The present invention relates to stampers applied in the manufacture of optical disks representative of which are DVDs and CDs.

2. Description of the Related Art

Optical disks such as DVDs and CDs are formed with a stamper in a mold made of a metal such as nickel, by pouring molten polycarbonate into the mold, and on the side having the pit-formed surface after molding, forming a vapor-deposition layer and a protective layer to yield an optical disk. By a conventional manufacturing technique of this sort, in parting the post-molded disk from the stamper, articles that mold-releasing irregularities cause to be defective a liable to be produced, with the defective rate amounting to 10–20 percent of the total. Specifically, although the disk is supposed to separate from the mold after it is opened, areas that then release easily from the mold and areas that do not will arise, and in the areas that release reluctantly the bumps furnished on the stamper side of the mold strike the edges on the opening rims of the pits transferred onto the disk, which ends up deforming the pits' contour. This mold-release defect, which spreads mottled-like on the impressed face of the disk, is referred to as clouding due to its nebulous look; and disks defective in outward appearance are not shipped out but are disposed of.

In connection with this kind of optical-disk manufacturing method, a proposal for improving the releasability of disks from mold stampers has been made known to the public in Japanese Pat. Pub. No. 2519985. Therein, after the stamper reverse face that contacts the inner surface of the die has been polished to under 0.1 s, by grinding the just-polished face with a polishing material such as sandpaper to roughen the surface texture to 0.3 to 0.2 s, the surface area of the stamper with respect to the die is decreased to suppress heat transmission to the die. Nevertheless, roughening the reverse face of the stamper unavoidably leads to the occurrence between the stamper and the die of relative displacement following on differences in thermal expansion and shrinkage rates, which makes the stamper reverse face quickly wear out and shortens its life span.

As a result of investigating causes giving rise to mold-release defects, the present inventor noted irregularities in the manner in which heat is conducted from the stamper to the die and came upon the scheme for the present invention. The temperature of the molten resin poured into the mold and the die temperature each differ somewhat during molding according to the molding conditions and the type of disk that is to be molded, but for the most part molten-resin temperatures are generally 300 to 400° C.; die temperatures 80 to 120° C. In this connection, stampers are made with nickel plate as a base material, and nickel's thermal diffusivity (coefficient of thermal diffusion) per unit time is fairly large (0.085 $m^2/h$). Consequently, it is conceivable that simultaneously with the molten resin that is filed into the die coming into contact with the molding surface of the stamper, the heat of the molten resin gets absorbed by the die via the stamper, rapidly cooling and hardening the molten-resin surface in contact with the stamper. As long as this hardening occurs equally over the entire disk including the land surface, and further as long as shrinkage of the resin takes place uniformly until the mold is opened, there will be no room for mold-release defects to arise; but in practice a large volume of defective products are produced, as noted earlier.

The molten resin that, contacting the stamper, locally is rapidly cooled and hardened as noted above divides into a hardened skin layer and a flowing layer that flows into the central space within the mold cavity; but the facility with which the skin layer traces the external configuration of the bumps deteriorates remarkably once hardening has set in. Consequently, the configurations of the bumps on the stamper do not get transferred accurately. In order to avert this sort of transfer defect and furthermore, reduce the flow resistance of the molten resin within the mold cavity, an injection-compression molding technique has been adopted. Therein, the force with which the mold is clamped in filling the molten resin into the cavity is lowered; then raising the mold-clamping force simultaneously with terminating the molten-resin fill causes the molten resin to adhere to the bumps, improving the transferability. Nevertheless, although the injection-compression molding technique heightens the molten resin transferability insofar as the mold clamping force is increased, the technique does not go so far as to nullify the local rapid cooling and hardening of the molten resin surface; presumably, because local internal stress is produced due to hardening inconsistencies as noted earlier, areas that release easily from the mold and areas that do not are created and the bumps furnished on the stamper side deform the configurations of the pits, which ends up clouding the disk.

SUMMARY OF INVENTION

An object of the present invention is an optical-disk stamper that nullifies mold-release defects stemming from mold-releasing irregularities when the mold is opened and meanwhile improves transferability during disk molding, to enable manufacturing high-quality optical disks at a favorable yield rate. Another object of the present invention is an optical disk stamper that nullifies rapid cooling and quick hardening of the surface of molten resin that is in contact with the molding face of the stamper to enable resolving mold-release defects originating in incidents of inconsistent internal stress. A further object of the present invention is an optical-disk stamper whose durability is improved and lifespan prolonged, and that enables favorable-yield-rate manufacturing as in the foregoing, and that at the same time enables manufacturing high-quality optical disks at low cost.

An optical-disk stamper set forth by the present invention, as shown in FIG. 1, is characterized in that on one side of a stamper body 1 a molding surface 2 furnished with bumps 3 for transfer-forming pits onto an optical disk is formed, and in that the molding surface 2, including bumps 3, is formed of a polymer resin whose thermal diffusivity is 0.01 $m^2/h$ or less.

Specifically, the entire stamper body 1 is formed from a polymer resin whose thermal diffusivity is 0.01 $m^2/h$ or less, superficially on which the molding surface 2 furnished with the bumps 3 is formed.

Another stamper, as shown in FIG. 7, is composed of a stamper body 11, formed from a metal baseplate, and a molding layer 12 laminated onto one side of the stamper body 11. The molding layer 12 is formed from a polymer resin whose thermal diffusivity is 0.01 $m^2/h$ or less, and the exterior face thereof is furnished with bumps 13 to form the molding surface.

Yet another stamper, as shown in FIG. 8, is composed of a stamper body 21, formed from a metal baseplate, one side of which is provided a molding surface 22 furnished with bumps 23, the molding surface 22, including the bumps 23 being coated with a polymer-resin coating layer 24 whose thermal diffusivity is 0.01 $m^2/h$ or less.

The polymer resins noted above are made up of heat-hardening resins including phenolic resins and epoxy resins whose thermal diffusivity is between 0.0004 and 0.001 m²/h.

From the following detailed description in conjunction with the accompanying drawings, the foregoing and other objects, features, aspects and advantages of the present invention will become readily apparent to those skilled in the art.

DETAILED DESCRIPTION

Figure 1:
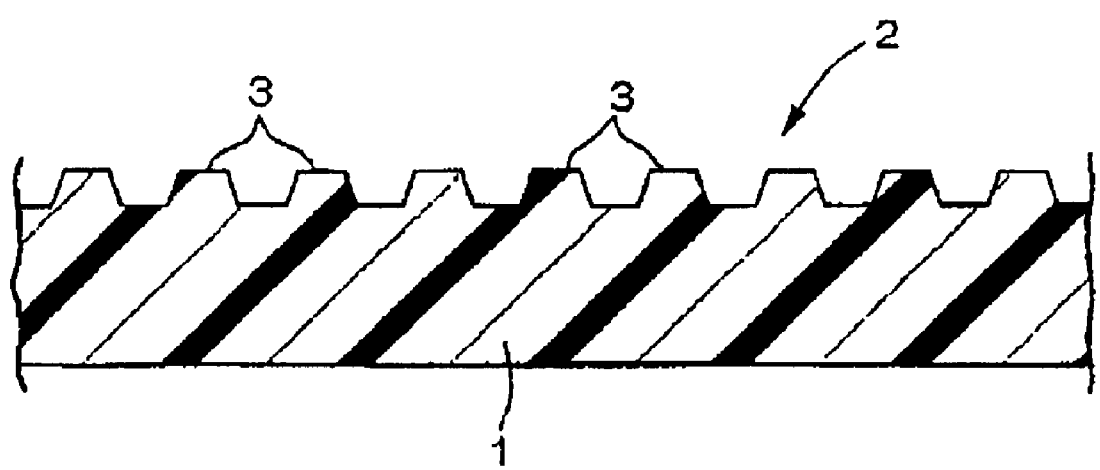
FIG. 1 is a fragmentary sectional view schematically illustrating a stamper embodied according to one aspect of the present invention.

In the present invention, by forming the molding surface 2 provided on one side of the stamper body 1 from a polymer resin that is a poor heat conductor whose thermal diffusivity is less than 0.01 m²/h, during the disk-molding process local hardening of the molten-resin surface by the heat of the molten resin that contacts the molding surface 2 being rapidly absorbed by the molding die through the molding surface 2 and the stamper body 1 is nullified. This prevents the surface of the molten resin filled into the die from hardening locally and enables gradually hardening of the disk as a whole. Accordingly, the fact that the resin filled into the mold may be maintained in a sufficiently soft state when the mold is clamped shut at the same time the molten-resin filling is ended causes the molten resin to adhere to the bumps 3 without gaps, enabling accurate transfer of the bump 3 configurations. Furthermore, the amount of time required to clamp the mold can be shortened compared to that of disk-forming processes using conventional stampers, therefore shortening the amount of time required for the disk-forming cycle, ultimately improving productivity. The amount of pressure applied for mold-clamping can also be reduced.

Insofar as the hardening of the post-filled resin is gradual, the hardening of the disk as a whole will be made the more uniform and the occurrence of internal stress due to local irregularities from rapid hardening will be the more certainly prevented—and the resin shrinkage that accompanies hardening will also be made the more uniform. Therefore, the clouding during mold-release that has been unavoidable with conventional stampers may be eliminated, remarkably lessening the occurrence of defective products and improving productivity in the manufacture of optical disks. Accordingly, the present invention enables the manufacture of high quality optical disks at a high yield-rate. It should be understood that if the thermal diffusivity of the polymer resin that the molding surface 2 is made of exceeds 0.01 m²/h, the speed and amount of heat conduction grow, which makes the resin that contacts the molding surface 2 cool and harden more rapidly.

Forming the entire stamper body 1 out of a polymer resin whose thermal diffusivity is less than 0.01 m²/h, and forming on the surface of the stamper the molding-surface 2 furnished with the bumps 3, significantly reduces the amount of conducted heat that passes through the stamper body 1 per unit time compared, for example, to a stamper made of nickel only, to reliably prevent abrupt cooling of the molten-resin filled into the mold. In comparison with the high-cost of the nickel used to form conventional stampers, this invention also lowers the manufacturing costs of the stamper itself.

Figure 7:
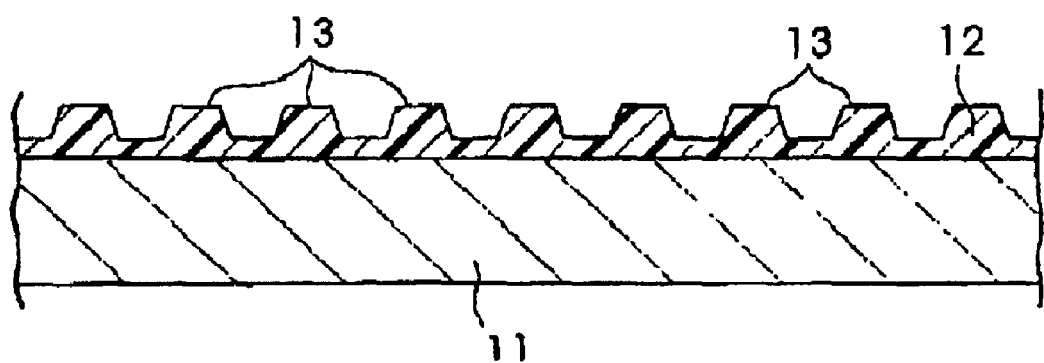
FIG. 7 is a fragmentary sectional view schematically illustrating a stamper embodied according to a separate aspect of the present invention.

With a stamper, as in FIG. 7, wherein the molding layer 12 is built on a meta baseplate formed stamper body 11 by laminating on one of its lateral faces a polymer resin whose thermal diffusivity is less than 0.01 m²/h, and the obverse surface thereof is formed as the molding surface including bumps 13, despite the stamper body 11 expanding and contracting attendant on the heat-cycling changes of the molding machine and friction arising where the stamper and the mold come into contact, the stamper body 11 will ultimately be kept from wearing out, improving its durability and prolonging its lifespan. In particular, this stamper exhibits the same level of durability as that of conventional stampers made entirely of nickel. With a molding layer 12 being formed on the surface of a metal stamper body 11, the molding layer 12 will sufficiently demonstrate a heat-conduction deterrent effect, yielding a stamper superior in overall characteristics.

Figure 8:
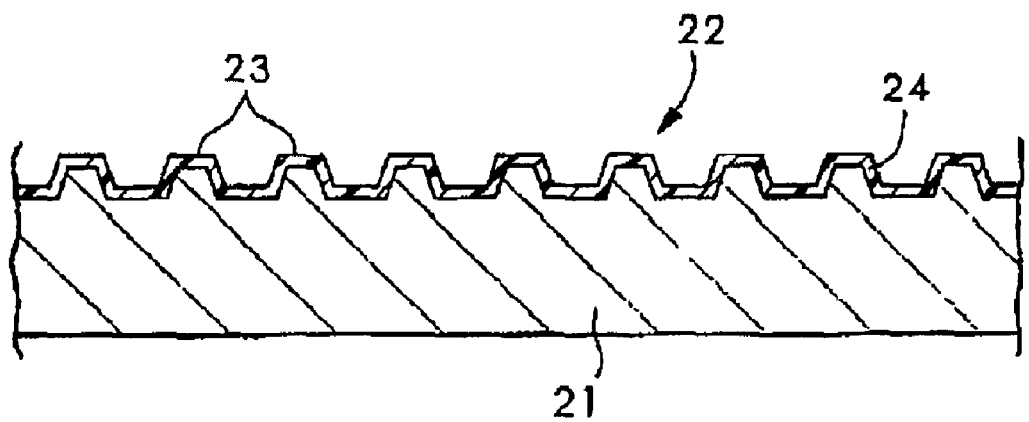
FIG. 8 is a fragmentary sectional view schematically illustrating a stamper embodied according to a different separate aspect of the present invention.

A stamper, as in FIG. 8, wherein a molding surface 22 including bumps 23 is formed on one of the lateral faces of a metal-baseplate formed stamper body 21 and a coating layer 24 is built superficially on the molding surface 22 including the bumps 23 by coating on a polymer resin exhibits a heat-conduction deterrent effect due to the coating layer 24 while demonstrating the same mechanical strength as the stamper body of an all-metal stamper, and therefore, compared with conventional stampers made only of nickel, prevents incidents of clouding during mold-release to reduce occurrences of defective products.

General phenolic resins and epoxy resins have coefficients of thermal diffusion between 0.0001 and 0.001 m²/h, and have been experimentally confirmed to improve mold-release characteristics. The cooling time required for resins with a thermal diffusivity less than 0.0004 m²/h is too long, which lowers productivity. Although coefficients of thermal diffusion in the range of 0.001 to 0.01 m²/h improve mold-release characteristics over the status quo, coefficients under 0.001 m²/h are preferable when considering overall characteristics including transferability.

Figure 2:
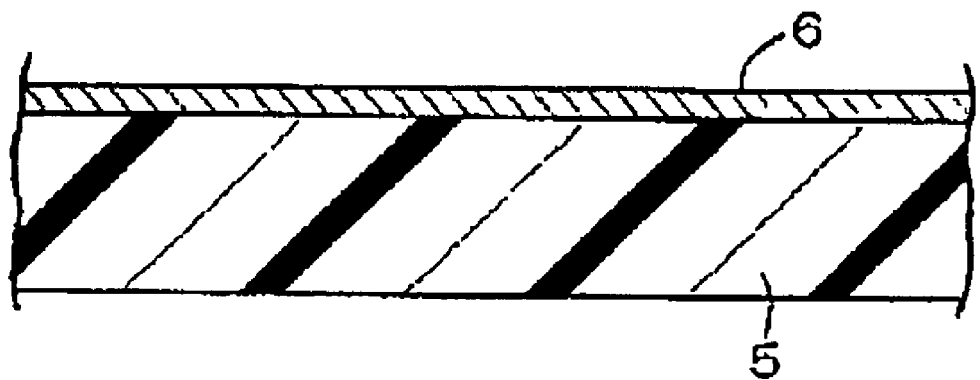
FIGS. 2 through 6 are fragmentary sectional views illustrating processes in the course of manufacturing the stamper of FIG. 1, wherein a laser and its beam are represented schematically in FIG. 3.

Reference is made to FIGS. 1 and 2, which illustrate one embodiment of an optical-disk stamper having to do with the present invention. The stamper consists of the stamper body 1 and the molding surface 2 that is formed one side of the stamper body 1; the entire stamper body 1 is made of a polymer heat-hardening resin. A set of bumps 3 is formed on the molding surface 2 for transfer-forming pits on an optical disk. The most suitable polymer heat-hardening resins for making the stamper body 1 are phenolic resins and epoxy resins, particularly resins with coefficients of thermal diffusion less than 0.01 m²/h, and more preferably phenol-resin monomers with a thermal diffusivity 0.0004 to 0.001 m²/h; polymer resins containing phenolic resins are otherwise suitable.

In this manner, the stamper body 1 made out of a polymer resin whose thermal diffusivity is small (that is a poor heat conductor) prevents the heat of the molten resin, such as polycarbonate, that contacts the molding surface 2 during the molding process from being rapidly absorbed by the mold via the molding surface 2 and the stamper body 1. Because th thermal gradient between the molten resin and the stamper body 1 may be sustained large over a long period, the molten resin takes its time hardening. This as a result imparts sufficient softness to the molten resin wherein the mold-clamping pressure is increased at the same time fill-introduction of the molten resin is terminated, consequently allowing the molten resin to adhere without gaps to the bumps 3 and enabling high-fidelity transfer of the bump configurations. Furthermore, the amount of time required for damping the mold in this case is shorter than that for conventional molds, reducing the disk-forming cycle period and therefore improving productivity. The amount of pressure applied during mold-clamping may also be reduced. Insofar as the disk hardens leisurely, the disk as a whole will harden more consistently, which therefore more assuredly prevents the occurrence of internal stress attendant an local irregularities from rapid hardening. As the hardening of the disk proceeds the more consistently in this way, the shrinking of the resin attendant on hardening is made uniform, the disks obtained may be readily released from the mold, without any clouding when released.

In fact, with conventional stampers formed from nickel, because the thermal diffusivity of nickel used is 0.085 $m^2/h$—an exponentially large coefficient compared with the 0.001 $m^2/h$ thermal diffusivity of phenolic resins—the heat of the polycarbonate ends up being rapidly absorbed by the molding die via the molding surface and the stamper, so that the thermal gradient between the molten resin and the stamper inevitably becomes abruptly smaller. As a result the resin surface that contacts the molding surface hardens rapidly, not only forfeiting any improvements in the transferability that should come from damping the mold, but unavoideably creating internal stresses that are attendant on local irregularities from rapid hardening.

The manufacturing process for the stamper described above is illustrated in FIGS. 2 through 6.

Exposure Layer Formation Process: First, as shown in FIG. 2, an exposure foyer 6 is formed by applying a negative photoresist on one side of a phenol-resin base 5 that has been adjusted to a specific thickness, and then drying it hard.

Figure 3:
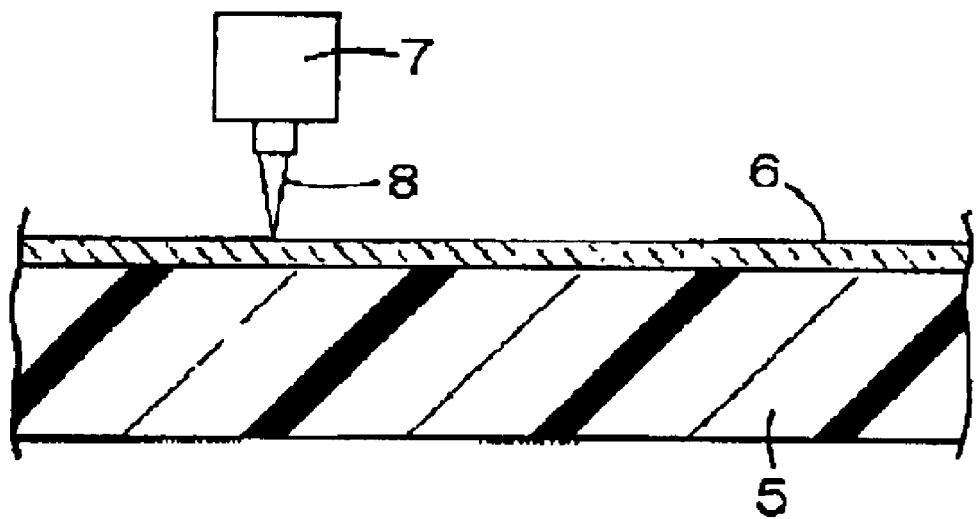

Photolithography Process: Next, as shown in FIG. 3, the base 5 is rotated a prescribed number of revolutions, and a laser head 7 is moved radially along the base 5 while a laser beam 8, which is modulated according to prerecorded informational signals, intermittently irradiates the exposure layer 6 to record a spiral latent image thereon.

Figure 4:
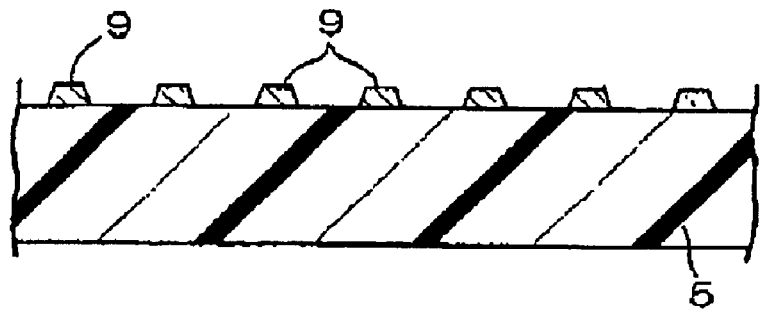

Developing Process: As shown in FIG. 4, bump prototypes 9 are formed by immersing the exposed base 6 in a developing solution that develops the recorded image, and then dissolving and removing the photo-resist remaining on the unexposed areas.

Figure 5:
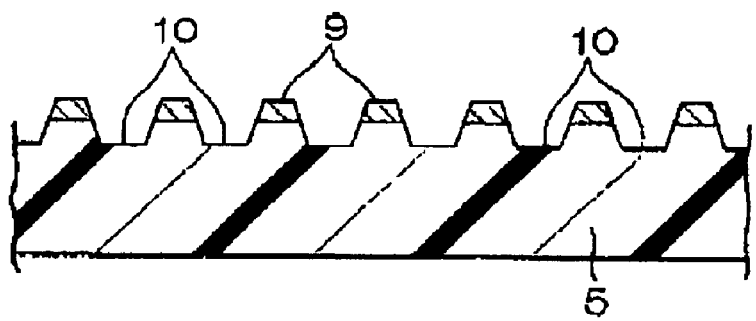

Etching Process: As shown in FIG. 5, etched depressions 10 are then formed by masking the bump prototypes 9 and dry-etching the exposed surface of the base 5.

Figure 6:
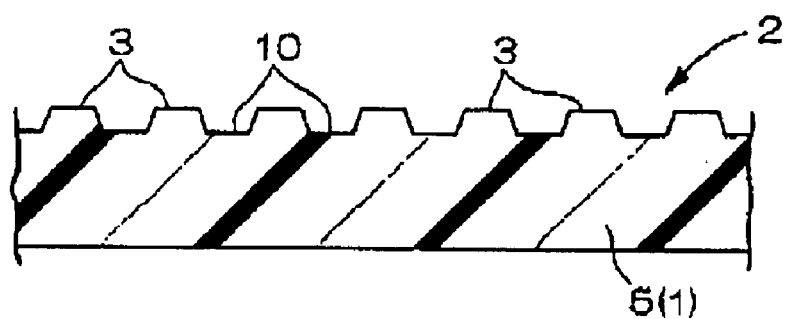

Photo-resist Removal Process: Finally, as shown in FIG. 6, a base 5 formed with bumps 3 in the traces of the removed bump prototypes 9—in other words the stamper 1—is obtained by removing the bump prototypes 9 remaining after etching. An ashing technique of exposing the bump prototypes 9 to oxygen plasma to turn them to ash, or dissolving of the bump prototypes 9 using a solvent are ways to remove the bump prototypes 9.

Reference is now made to FIG. 7, which illustrates another embodiment of a stamper having to do with the present invention. In this embodiment, the stamper is composed of the stamper body 11, which is formed from a metal baseplate, and the molding layer 12, which is laminated to one side of the stamper body 11. The stamper body 11 is made from a nickel plate material superficially onto which a molten phenolic resin is applied and dried-hardened, forming a 0.1 to 10 $\mu$m thick molding layer 12 when dry. The same raw material used for the base 5 described in the foregoing embodiment may also be utilized for the, phenolic resin when making the molding layer 12. After the molding layer 12 is built, the bumps 13 are formed on it superficially by the same procedure as described in the previous embodiment. Materials other than nickel, such as aluminum and stainless steel plates, can also be adopted as the formative raw material for the stamper body 11. If the dry thickness of the molding layer 12 is less than 0.1 $\mu$m, securing the necessary height for the bumps becomes difficult; if the thickness exceeds 10 $\mu$m, the adherence of the molding layer 12 to the metal baseplate grows poor. The most preferable thickness should be 1 to 2 $\mu$m.

Making the stamper body 11 out of a nickel or other metal baseplate in this manner enhances the mechanical lifespan of the stamper and enables using the stamper over an extended period of time. To be more specific, when molding optical disks, the stamper thermally expands, or else contracts, following changes in the heat cycle of the molding machine, and extending and shrinking of the stamper body 11 leads to friction occurring where the stamper is contact with the mold, wearing it out before long. Nevertheless, because forming the stamper body 11 from a nickel or other metal baseplate ultimately keeps it from wearing out due to friction, the stamper body 11 exhibits the same durability as that of conventional stampers that are made entirely of nickel.

Referring now to FIG. 4, which shows yet another embodiment of a stamper having to do with the present invention, in this embodiment, the molding surface 22 furnished with bumps 23 is provided on one surface of a stamper body 21, which is made of a nickel plate material; and the molding surface 22 including the bumps 23 is coated with a phenolic resin film whose thermal diffusivity is—likewise as in the foregoing embodiments—less than 0.001 $m^2/h$. Reference mark 24 in the figure indicates this rating layer. The technique illustrated in FIGS. 2 through 6 can as such be adopted as a method for forming on the stamper body 21 the molding surface 22 furnished with the bumps 23. Spread-coating or vapor deposition may be employed as coating methods for forming the coating layer 24, but using a spinning method to coat the surface is the most cost effective method and produces a high-grade film of uniform thickness. The dry thickness of the coating layer 24 should be in the range of a few hundred to a few thousand Å. The stamper in this embodiment, likewise as in the foregoing embodiments, lets the stamper body 21 be saved from wear originating in the extending and shrinking attendant on changes in the molding machine heat cycle, improving the stamper's durability with long-term use.

By laminating the signal-recording surface of disks obtained using the above-described stamper(s) with a reflective layer and a protective layer, DVDS, CDs, or MDs can be manufactured and, by bonding two disks back-to-back, double-sided DVDs can also be manufactured.

Only selected embodiments have been chosen to illustrate the present invention. To those skilled in the art, however, it will be apparent from the foregoing disclosure that various changes and modifications can be made herein without departing from the scope of the invention as defined in the appended claims. Furthermore, the foregoing description of the embodiments according to the present invention is provided for illustration only, and not for limiting the invention as defined by the appended claims and their equivalents.

What is claimed is:

1. An optical-disk stamper comprising:
    a stamper body:
    a molding surface formed on a side of said stamper body and furnished with bumps for transfer-forming pits onto an optical disk; wherein
    at least said molding surface, including said bumps, is formed of a synthetic polymer whose thermal diffusivity is 0.01 $m^2/h$ or less.

2. An optical-disk stamper as set forth in claim 1, wherein the entire stamper body is formed from a synthetic polymer whose thermal diffusivity is 0.01 $m^2/h$ or less, superficially on which said molding surface furnished with said bumps is formed.

3. An optical-disk stamper, comprising:
    a stamper body formed from a metal baseplate;
    a molding layer laminated onto one side of said stamper body, said molding layer being formed from a synthetic polymer whose thermal diffusivity is 0.01 $m^2/h$ or less; and
    bumps furnished superficially on said molding layer to form an optical-disk molding surface.

4. An optical-disk stamper, comprising:
    a stamper body formed from a metal baseplate;
    a molding surface furnished with bumps, formed one side of said stamper body; and
    a synthetic-polymer coating layer whose thermal diffusivity is 0.01 $m^2/h$ or less, coated on said—molding surface, including said bumps.

5. An optical-disk stamper as set forth in claim 1, wherein said synthetic polymer is made up of heat-hardening resins including a phenolic or an epoxy resin whose thermal diffusivity is from 0.0004 to 0.001 $m^2/h$.

6. An optical-disk stamper as set forth in claim 2, wherein said synthetic polymer is made up of heat-hardening resins including a phenolic or an epoxy resin whose thermal diffusivity is from 0.0004 to 0.001 $m^2/h$.

7. An optical-disk stamper as set forth in claim 3, wherein said synthetic polymer is made up of heat-hardening resins including a phenolic or an epoxy resin whose thermal diffusivity is from 0.0004 to 0.001 $m^2/h$.

8. An optical-disk stamper as set forth in claim 4, wherein said synthetic-polymer coating layer is made up of heat-hardening resins including a phenolic or an epoxy resin whose thermal diffusivity is from 0.0004 to 0.001 $m^2/h$.

* * * * *